United States Patent
Mouazer et al.

(10) Patent No.: US 8,829,243 B2
(45) Date of Patent: Sep. 9, 2014

(54) METHOD FOR REMOVING METHYLENE-BRIDGED POLYPHENYL POLYAMINES FROM AN AQUEOUS STREAM

(75) Inventors: Rabah Mouazer, Wavre (BE); Johannes Lodewijk Koole, Kessel-Lo (BE); Ramon Scheffer, Baton Rouge, LA (US)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 13/391,743

(22) PCT Filed: Jul. 22, 2010

(86) PCT No.: PCT/EP2010/060627
§ 371 (c)(1),
(2), (4) Date: Apr. 2, 2012

(87) PCT Pub. No.: WO2011/026690
PCT Pub. Date: Mar. 10, 2011

(65) Prior Publication Data
US 2012/0184775 A1   Jul. 19, 2012

(30) Foreign Application Priority Data
Sep. 2, 2009 (EP) ..................................... 09167225

(51) Int. Cl.
*C07C 211/00* (2006.01)
*C08G 73/02* (2006.01)
*C08G 12/08* (2006.01)

(52) U.S. Cl.
CPC ............ *C08G 73/0266* (2013.01); *C08G 12/08* (2013.01)
USPC .......................................................... 564/307

(58) Field of Classification Search
None
See application file for complete search history.

(56) References Cited

U.S. PATENT DOCUMENTS

2010/0204510 A1   8/2010   Carr et al.
2011/0263809 A1   10/2011  Carr et al.

FOREIGN PATENT DOCUMENTS

| EP | 697 396 | 2/1996 |
| EP | 2 039 676 | 3/2009 |
| WO | WO 2009/037088 | 3/2009 |
| WO | WO 2009/037089 | 3/2009 |

OTHER PUBLICATIONS

"Pertraction of Brine Effluent from Methyl Diphenyl Diamine (MDA) Process instead of Direct Contact Extraction", R. Klaassen, R. Carr, J. Koole, Poster presented at the 11th Netherlands Membranengenootschap (NMG) Posterdag Membraantechnologie, Oct. 27, 2005, Ede, The Netherlands.

*Primary Examiner* — Clinton Brooks
(74) *Attorney, Agent, or Firm* — Robert A. Diaz

(57) ABSTRACT

A method for removing methylene-bridged polyphenyl polyamines from an aqueous stream comprising said methylene-bridged polyphenyl polyamines according to the invention comprises the steps of
  Providing a pertraction equipment comprising a membrane with a first side and a second side opposite to said first side;
  Bringing an aqueous stream comprising methylene-bridged polyphenyl polyamines into contact with the first side of the membrane and bringing an organic stream into contact with the second side of the membrane, thereby causing the methylene-bridged polyphenyl polyamines to transfer from the aqueous stream through the membrane to the organic stream.
The method further comprises, before bringing the aqueous stream and organic stream in contact with the membrane, the step of wetting the membrane with a liquid having a surface tension of less than 40 mN/m.

21 Claims, 4 Drawing Sheets

Conventional DADPM Process

Figure 1: Conventional DADPM Process

METHOD FOR REMOVING METHYLENE-BRIDGED POLYPHENYL POLYAMINES FROM AN AQUEOUS STREAM

CROSS-REFERENCE TO RELATED APPLICATIONS

This application is the National Phase of International Application PCT/EP2010/060627 filed Jul. 22, 2010 which designated the U.S. and which claims priority to European App. Serial No. 09167225.3 filed Sep. 2, 2009. The noted applications are incorporated herein by reference.

The present invention relates to a method for removing methylene-bridged polyphenyl polyamines from an aqueous stream, and to a method for producing methylene-bridged polyphenyl polyamines.

Production of methylene-bridged polyphenyl polyamines in general is well known and described in e.g. WO2009037087 and WO2009037088. A conventional diaminodiphenylmethane process is shown in FIG. 1.

Aniline and formaldehyde are converted, in presence of an acid catalyst, typically hydrochloric acid, in to methylene-bridged polyphenyl polyamines. The effluent of the reactors is neutralized using a base, typically caustic soda. The neutralized effluent is separated by means of a phase separator, into an organic phase, substantially consisting of methylene-bridged polyphenyl polyamines, comprising diaminodiphenylmethane (DADPM), and aniline, and an aqueous brine phase, comprising water, salt and traces of DADPM and aniline.

The organic phase is further treated for recovering the DADPM. The aqueous phase is to be treated before the water in this phase can be provided to a waste treatment installation, typically a biological cleaning installation.

The aqueous phase is washed with aniline to extract and recover the remaining DADPM, and again the liquid of the washing operation is separated for a second time in an aqueous brine phase and an organic phase, the latter substantially consisting of aniline and DADPM with some traces of water, and an aqueous phase. Typically this washing and separating is done in one apparatus.

The aqueous phase, both before and after this second separation, comprises nearly all salt provided by the neutralization of the acid catalyst. The aqueous phases are typically referred to as brine. In the presently known processes, this brine, after the second phase separation, is further treated to remove the remaining aniline from the brine by means of a so-called aniline stripping column, before the brine is treated in a waste water treatment unit.

As explained in WO2009037087 and WO2009037088, the difference in density of the organic phases and the aqueous brine must be sufficiently large, in order to obtain effective phase separation. This often requires either the addition of salt, or to remove water from the brine by evaporation. It is clear that both cause additional costs to the process.

Hence there is a need for an alternative process to remove DADPM from aqueous streams, in particular from brine streams in DADPM production processes, which alternative is sufficiently robust and reliable to work under varying process conditions, such as varying brine concentrations and varying DADPM concentrations in the aqueous stream, and this without the need to adjust the brine strength (the amount of salt in the aqueous phase).

The above objectives may be accomplished by a method for removing methylene-bridged polyphenyl polyamines from an aqueous stream comprising the methylene-bridged polyphenyl polyamines according to a first aspect of the present invention.

A method for removing methylene-bridged polyphenyl polyamines from an aqueous stream comprising the methylene-bridged polyphenyl polyamines according to the present invention comprises the steps of providing a pertraction equipment comprising a membrane with a first side and a second side opposite to this first side;

bringing an aqueous stream comprising methylene-bridged polyphenyl polyamines into contact with the first side of the membrane and bringing an organic stream into contact with the second side of the membrane, thereby causing the methylene-bridged polyphenyl polyamines to transfer from the aqueous stream through the membrane to the organic stream.

The method further comprises, before bringing the aqueous stream and organic stream in contact with the membrane, the step of wetting the membrane with a liquid having a surface tension of less than 40 mN/m.

The organic phase preferably comprises or even consists of aniline.

More preferred, the liquid used to wet the membrane has a surface tension less than 35 mN/m. Preferred liquids used to wet the membrane are liquids which dissolve in the organic phase, preferably being aniline. More preferred, toluene, methanol, ethanol or cyclohexanol is used.

The surface tension referred to is to be understood as the surface tension at 20 deg C.

This liquid used to wet the membrane is also referred to as wetting agent.

Thus, before starting the pertraction, the membrane is wetted, or so-to-say pre-wetted, before contacting the membrane with both the aqueous stream comprising methyl-bridged polyphenyl polyamines and the organic stream, which wetting is done using a suitable liquid having a surface tension of less than 40 mN/m, optionally being toluene or cyclohexanol, ethanol or methanol. Preferably, a liquid having a surface tension of more than 10 mN/m and less than 40 mN/m is used, e.g. an alcohol, e.g. an alcohol with a surface tension of more than 15 mN/m and less than 35 mN/m. Wetting and pre-wetting is to be understood as filling substantially all pores of the membrane with this suitable liquid, thereby expelling the air from the pores.

The liquid surface tension is measured using the AquaPi tensiometer of the company Kibron Inc, Finland. As an example, toluene has a liquid surface tension, measured using the AquaPi tensiometer of 22 mN/m, methanol has a liquid surface tension, measured using the AquaPi tensiometer of 22.7 mN/m, ethanol has a liquid surface tension, measured using the AquaPi tensiometer of 22.1 mN/m and cyclohexanol has a liquid surface tension, measured using the AquaPi tensiometer of 34 mN/m. All surface tensions are measured at room temperature, i.e. 20° C.

Once the air has been expelled by the wetting agent, it is more easily substituted by the organic phase, in particular in case aniline is used as organic phase, and therefore the pores will be filled with organic phase, typically aniline, for the pertraction to take place.

Wetting or pre-wetting with aniline is difficult, if possible at all. It typically requires a high pressure, typically more than 0.5 bar, to push the aniline in the pores of the membranes, which is complicated in operational conditions and might endanger the physical integrity of the membrane itself and the module as a whole.

According to some embodiments, the membrane, after wetting with the liquid, may have a water break through pressure of more than 0.2 bar.

The water break through pressure of the membrane, after wetting with the wetting agent, is the pressure difference measured between the two surfaces of the membrane, which pressure is necessary to force water through the membrane.

This measurement is done using a breakthrough cell, which measures the pressure applied and the resultant flux of the permeate through the membrane by this pressure. Breakthrough pressure is reached when water flux (or in this particular method, brine flux) starts to increase linearly with pressure.

Preferably the break through pressure of the membrane, after wetting with a wetting agent, is more than 0.5 bar.

An over-pressure, e.g. of 0.5 bars, is applied in the brine phase as compared to the organic phase, e.g. aniline, as typically this is not enough to have a breakthrough of the brine into the organic phase, e.g. an aniline phase, and expel the organic liquid of the organic phase, such as aniline, from the pores of the membrane. However this pressure will be sufficient to keep the organic phase, e.g. aniline, from flowing through the membrane and assures an interface area on the surface or pores of the membrane for mass transfer, allowing extraction of methylene-bridged polyphenyl polyamines by an organic phase such as aniline to take place.

According to some embodiments, the membrane may be provided as one sheet of porous material. A sheet of porous material is hereinafter referred to as a porous sheet.

According to some embodiments, the membrane may consist of one porous sheet.

According to some embodiments, the membrane may comprise at least two stacked porous sheets.

The at least two sheets are stacked, which means that the sheets are in contact with at least one of the other sheets along one of its surfaces. The sheets form a layered membrane, all sheets being substantially parallel with the each other.

Using a membrane comprising two or more layers of porous sheets, has the beneficial effect as would the pore size, and more particular the standard deviation of the pore size distribution of the membrane be reduced.

According to some embodiments, at least one of the one or more porous sheets may have an average pore size less than or equal to 0.05 micron.

Preferably, in case of a plurality of stacked porous sheets, each of the stacked porous sheets may have an average pore size in the range of up to 0.05 micron.

It is understood that along the surface of the sheet, not all pores have an identical pore size, equal to the average pore size. The dimensions of the pores of the sheet are a parameter subjected to a statistic distribution, characterized by an average and a standard deviation.

Preferably substantially no pores, or even no pores have a pore size of more than 0.05 micron, this in particular if only one porous sheet is used as a membrane.

The membrane, optionally some or all of its sheets, is preferably a hydrophobic membrane, such as membranes provided from polytetrafluoroethylene (PTFE), fluorinated ethylene propylene (i.e. a copolymer of hexafluoropropylene and tetrafluoroethylene, also referred to as FEP), perfluoroalkoxy (PFA) or combinations thereof. Such as Dyneon™ TFM™ PTFE, or any modified PTFE.

The membrane, and optionally some or all of its sheets, may have a pore size of 0.05 micron maximum and a high hydrophobicity. Membranes can be used as flat sheets, tubular structures, and are optionally hollow fiber structures. They can be ceramic or polymeric membranes. The membranes preferably are made from PTFE, PFA, PVDF, PP, PEEK, polycarbonate, carbon or any other suitable and optionally hydrophobic materials. Thickness of the membranes may be up to 2 mm, but preferably are in the range of up to and including 1 mm.

The pore size of the membrane, either as a one layer porous sheet or comprising a stack of porous sheets, has an influence on the mass transfer of methylene-bridged polyphenyl polyamines flowing through the membrane from the aqueous stream to the organic stream. On the one hand, the selection of this average pore size, and its deviation, keeps the methylene-bridged polyphenyl polyamines mass transfer at an economically acceptable level, whereas on the other hand, it increases the aqueous resistance of the membrane. The latter means that the pressure necessary to force water to flow through the membrane, is kept sufficiently high, hence the system can be operated in a process being subject to normal process fluctuations, such as pressure fluctuations.

The pore size and the uniformity of the pore size, i.e. the substantially small deviation of the pore size from the average pore size, avoids break through of water through the membrane.

The aqueous stream may be one of the brine waste stream of a DADPM production unit, such as in general described in e.g. WO2009037087 and WO2009037088. Preferably it is the brine stream after neutralization of the effluent of the DADPM reactor, obtained by means of a phase separator.

According to some embodiments, the organic stream used in the pertraction step comprises or even substantially or completely consists of aniline. The organic phase used in the pertraction, is preferably a fraction of the aniline which is used as feed stream of the DADPM production unit.

As an alternative, wet aniline (aniline with dissolved water) or toluene may be used.

The membranes are held in a pertraction module, suitable to allow the two liquid streams to flow, each on one side of the membrane. The use of membrane being provided from fluorinated ethylene propylene (i.e. a copolymer of hexafluoropropylene and tetrafluoroethylene, also referred to as FEP), perfluoroalkoxy (PFA) or combinations thereof are preferred. This because these materials can be thermally welded to the parts of the frame contacting the membrane. Such frame parts are preferably provided from polytetrafluoroethylene (PTFE), fluorinated ethylene propylene (i.e. a copolymer of hexafluoropropylene and tetrafluoroethylene, also referred to as FEP), TFM PTFE, which is a modified PTFE, and perfluoroalkoxy (PFA) or combinations thereof. Optionally also other polymer frame parts, such as polypropylene frame parts may be used, which frame parts optionally may be welded to the membrane using appropriate welding temperatures.

The membranes may be positioned in a module as flat sheets, i.e. being held substantially according to a flat surface, or as cylindrical tubes, or as a spirally wound membrane. In case of tubular membranes, the aqueous stream may flow in the tube, the organic stream at the outer side of the tubes, or vice versa.

Preferably the two streams flow counter-stream, i.e. the streams flow in an opposite direction along the membrane, or cross stream. Preferably the purest aqueous stream meets the purest organic stream.

To allow liquid to flow between the membranes, typically held in a frame, spacers may be provided between the membranes, in order to create channels space for allowing the liquid to flow between the membranes, and to contact the sides of the membranes. Also these spacers are preferably provided from polypropylene (PP), polytetrafluoroethylene (PTFE), fluorinated ethylene propylene (i.e. a copolymer of hexafluoropropylene and tetrafluoroethylene, also referred to as FEP), TFM PTFE, and perfluoroalkoxy (PFA) or combinations thereof.

According to some embodiments, the temperature of the aqueous stream and the organic stream during pertraction may be in the range of 50 deg C. to 200 deg C.

The pertraction of the methylene-bridged polyphenyl polyamines from an aqueous stream using an organic stream as set out above, in particular when the aqueous stream is a brine stream of a methylene-bridged polyphenyl polyamine production unit and the organic stream is an aniline stream, is preferably performed at process temperatures ranging between 50 deg C and 200 deg C, more preferred in the range of 75 deg C. to 125 deg C. During the pertraction, the aqueous and organic stream may exchange thermal energy as well.

To perform the pertraction, an overpressure in the aqueous stream as compared to the organic stream is to be provided. Suitable pressure differences between aqueous and organic stream may vary between 0.1 bar and the pressure defined by the aqueous resistance of the membrane, which may be e.g. up to 1 bar. Preferably a very stable pressure difference is used, e.g. having pressure deviation during processing of less than 0.1 bar.

In order to keep the pressure stable, preferably static pressures are used.

According to some embodiments, the volume ratio of aqueous stream over organic stream used during pertraction may be in the range of 20/1 to 2/1.

The volume ratio of aqueous stream over organic stream used during pertraction may preferably be in the range of 10/1 to 5/1.

Hence according to a second aspect of the present invention, a method for producing methylene-bridged polyphenyl polyamines is provided.

A method for producing methylene-bridged polyphenyl polyamines according to the present invention comprises the steps of provinding aqueous stream comprising methylene-bridged polyphenyl polyamines and removing methylene-bridged polyphenyl polyamines from said aqueous stream by a method according to the first aspect of the present invention.

The aqueous stream comprising methylene-bridged polyphenyl polyamines may be a brine obtained after the conversion of aniline and formaldehyde, in presence of an acid catalyst, typically hydrochloric acid, in to methylene-bridged polyphenyl polyamines, and neutralizing the effluent using a base, typically caustic soda. The neutralized effluent may be separated using a phase separation, into an organic phase, substantially consisting of methylene-bridged polyphenyl polyamines and aniline, and an aqueous brine phase, comprising water, salt and traces of DADPM and aniline.

Brine strength variations may, only to a minor extent, influence the performance of the pertraction. However, preferably stronger brines are used, such as 8% brine or higher. It was found that the distribution coefficient between aqueous and organic phase increases with higher brine strengths in the organic phase, i.e. the higher brine strengths are used, the more DADPM is transferred to the organic phase. This effect is mainly noticeable when varying the brine concentration from low brine concentrations up to concentrations as 10% brine. Preferably brine strengths of above 8% are used, such as more than 10%, e.g. in the range of 10% to 12%.

Brine strength, expressed as a percentage, refers to the weight of the salt dissolved per weight unit of the brine.

An aqueous stream can have typically around 2000 to 3000 ppm of DADPM, while concentrated brine streams may have around 200 to 300 ppm of DADPM content. As the higher brine strength has an effect on the distribution coefficient also, the amount of aniline needed to wash the stream is significantly reduced.

Before starting up the pertraction, the membrane is wetted preferably using toluene, ethanol or methanol.

An advantage of the use of any of the methods according to the invention, is that a washing step, washing the brine with aniline and subsequent separating the washing mixture into again an organic aniline phase comprising DADPM and a brine phase comprising aniline, is replaced by the pertraction step. The benefit is that to perform the pertraction, no brine evaporation is necessary to bring the brine to a desired density (brine strength) sufficient to perform the phase separation efficiently. As such, no energy is required to perform the evaporation, hence an economical benefit is obtained. The use of a method according to the present invention, may make the extraction step more robust and reliable to process parameter fluctuations. The presence of free organics in the aqueous stream can be dealt with.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

The present invention will be described with respect to particular embodiments.

It is to be noticed that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

Unless otherwise specified, the term "% w" or weight percentage of a component refers to the weight of the component over the total weight of the composition in which the component is present and of which it is part.

The term "methylene-bridged polyphenyl polyamines", also referred to as DADPM or MDA, includes both diamino-diphenylmethane isomers, such as 4,4'-diaminodiphenyl-methane, 2,4'-diaminodiphenylmethane and/or 2,2'-diamino-diphenylmethane, and higher homologues thereof or higher polymers thereof. Unless otherwise specified, the liquid's surface tension is measured using the AquaPi tensiometer of the company Kibron Inc, Finland, at room temperature, i.e. 20° C.

Figure 1:
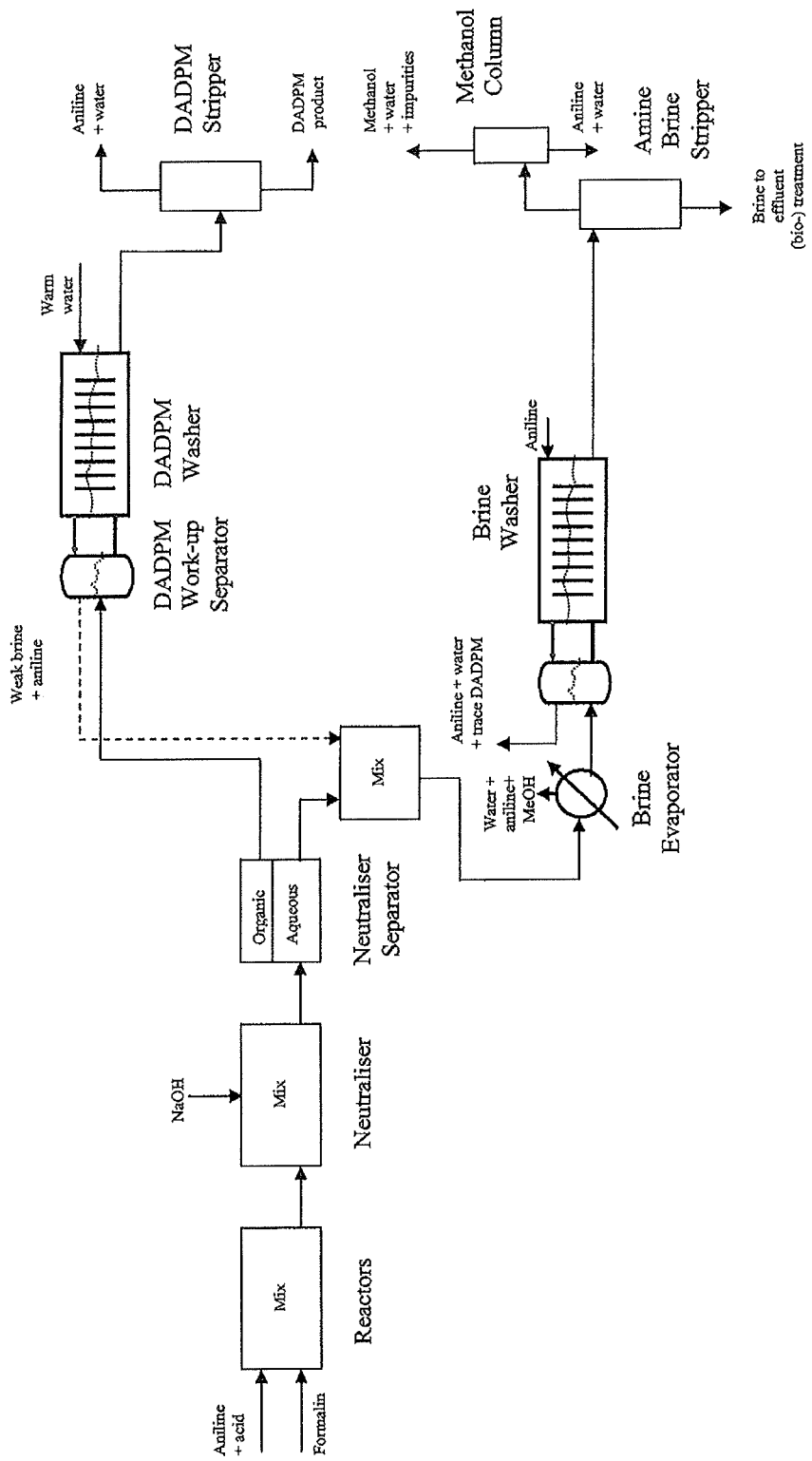
FIG. 1 is a schematically view of a conventional DADPM production process.
Figure 2:
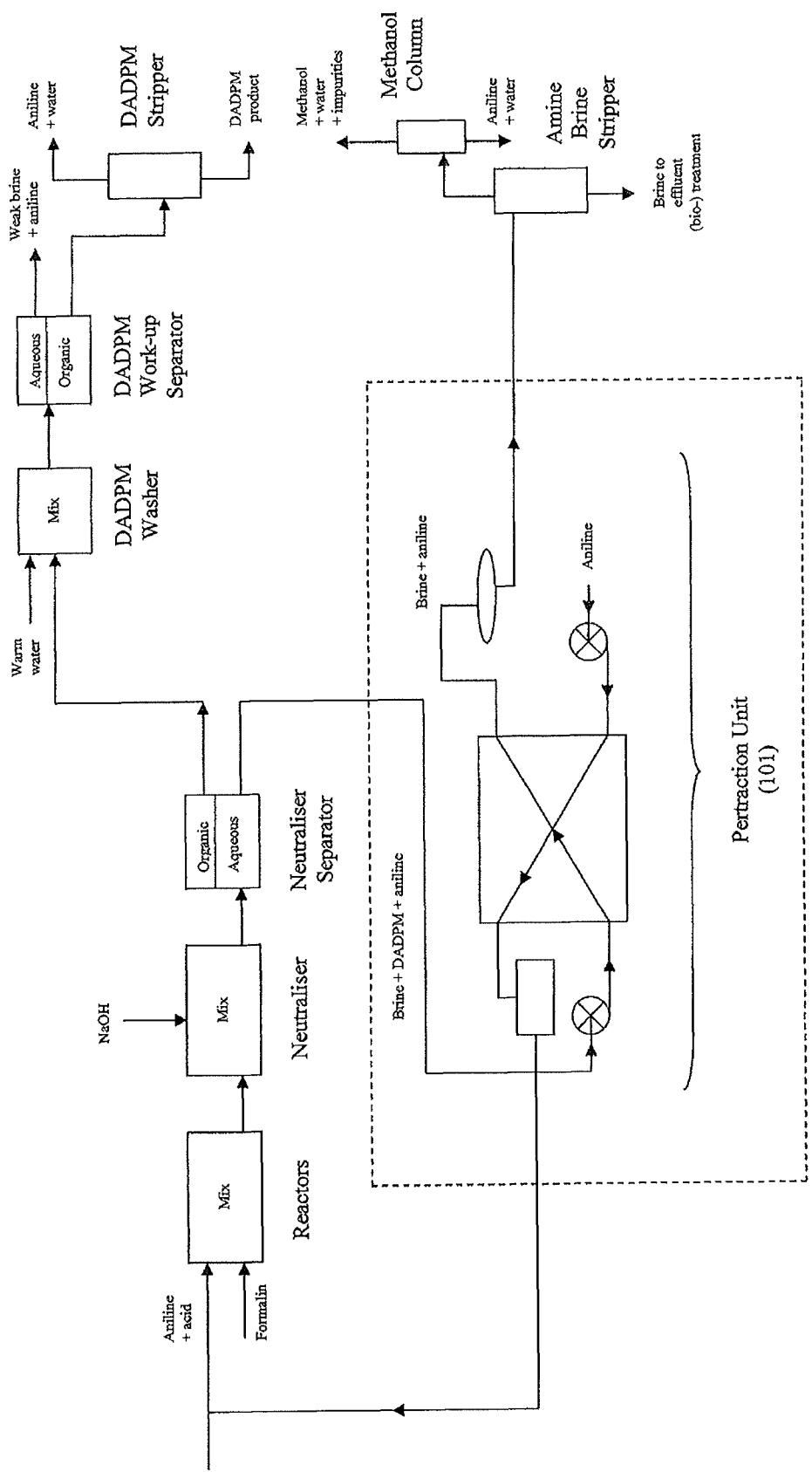
FIG. 2 is a schematically view of a DADPM process according to the present invention.

In comparison to FIG. 1, a pertraction unit 101 treats the brine, being the aqueous phase of the phase separation after the DADPM reactors effluent was neutralized with caustic soda as shown in FIG. 2.

Figure 3:
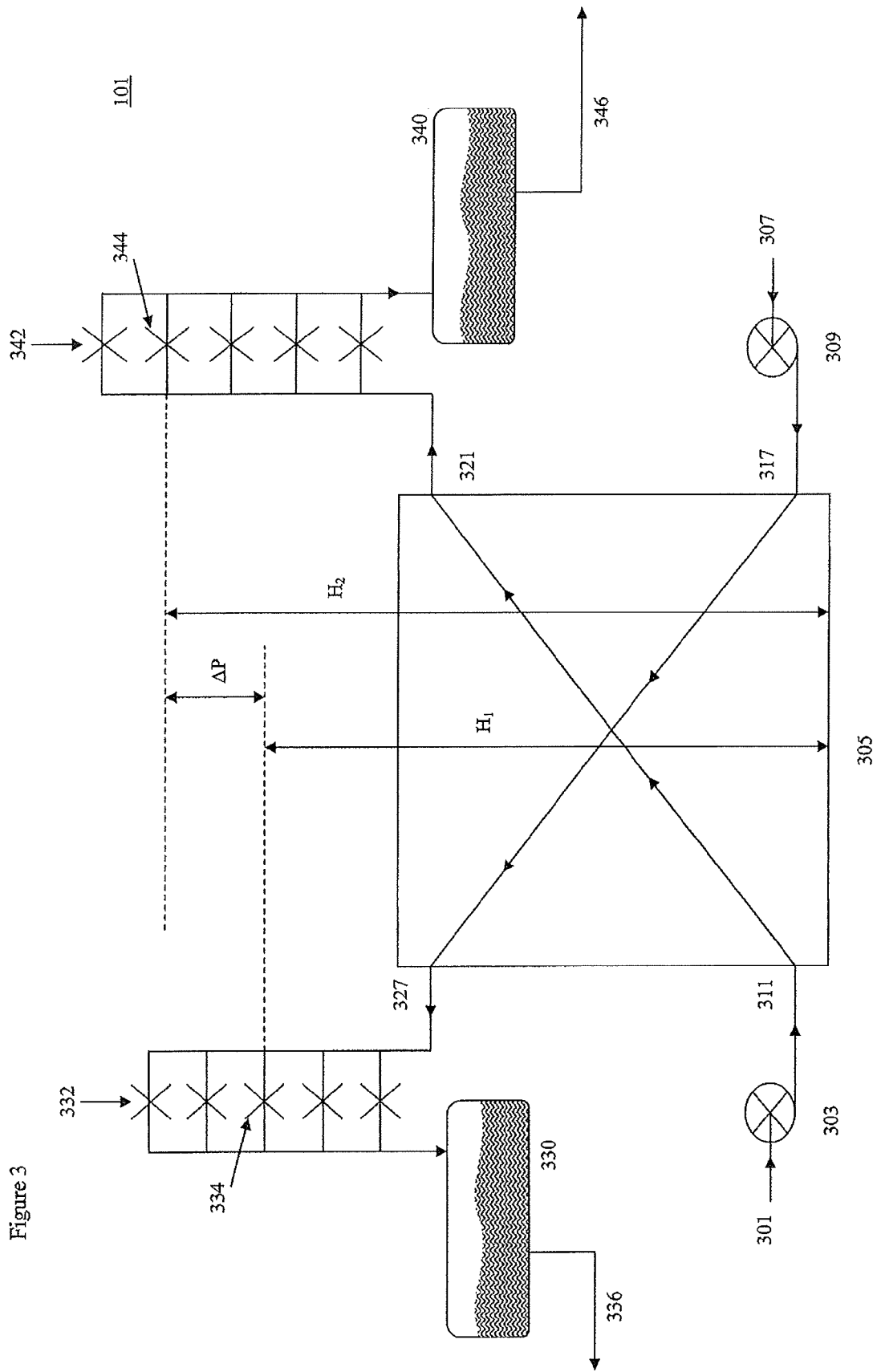
FIG. 3 shows schematically some details of a pertraction unit of the DADPM process of FIG. 2.

Details of this pertraction unit are shown in FIG. 3.

The pertraction unit 101 comprises a pertraction module 305. A pertraction module 305 comprising the membranes either in tubular or flat form, and allowing two liquid streams to contact each one side of the membranes, is provided with a brine stream 301 contaminated with aniline and DADPM, optionally by means of an pump 303 as the first liquid stream, and with an aniline stream 307, optionally by means of a pump 309 as the second stream. The aqueous stream may be one of the brine streams of a DADPM production unit, and in this particular embodiment t, it is the brine stream of the phase separator, installed after neutralization of the reactor effluent.

Both the aniline stream 307 and the brine stream 301 flows through the pertraction unit from its inflow side 311, respectively 317 to its outflow side 321, respectively 327. The pertraction module 305 is designed such that the aniline stream 307 at its inflow side 317 meets the brine stream 310 at its outflow side 321. As such the fresh aniline meets the brine stream which has been cleaned from DADPM by pertraction while passing through the pertraction unit 305. The aniline having passed through the pertraction module 305 meets the brine stream which has not been cleaned from DADPM at its inflow side.

The pertraction modules membrane, being e.g. of PTFE, may be very hydrophobic. At start up, the aniline nor the brine can easily expel the air from the pores of the membrane. Hence mass transfer through the membrane is difficult to be obtained. Forcing the aniline in the pores by pressure requires too high pressure (pressure>0.5 bars) and may compromise safe functioning of the membrane after start up.

Before start up, a wetting liquid with the surface tension less than 40 mN/m, and more preferably less than 35 mN/m is used to fill the pore. This may be done by filling the module with wetting agent and allow the wetting agent to penetrate into the membrane. Some pressure may be used. Once wetted, the excess of wetting agent may be evacuated before start up.

After start up, the wetting liquid in the membrane is dissolved in aniline. Preferably, toluene, cyclohexanol, ethanol or methanol is used. Though toluene and methanol are more preferred, methanol is most preferred, because this product can be treaded and separated of easily and its use does not require any major change in the normal production processes.

As the membrane is wetted with the wetting agent, which thereafter is being replaced by aniline, water or brine phase cannot pass through the membrane at low pressures, though at higher pressures breakthrough of the brine phase can happen. Therefore a delicate pressure difference is preferably provided which puts the brine side at a higher pressure then aniline side. This assures that aniline will stay at the surface of the membrane and creates an interfacial area between the aniline and brine for mass transfer but should be also not too high for brine to break through the hydrophobic membrane.

In order to provide a well balanced and controllable pressure difference over the membranes, i.e. an overpressure at the brine side compared to the aniline side, the aniline leaving the pertraction module 305 is provided, via an overflow system 332 of tubing and valves, to a vessel 330 which held at atmospheric pressure. The tubes are designed such that the dimension of the tubes is too large to be completely filled with aniline effluent from the pertraction module 305 under normal operational conditions. As such, the opened valve 334, located at the highest elevation H1 will define the static pressure in the aniline stream in the pertraction module 305.

In a similar way, the brine leaving the pertraction module 305 is provided to a vessel 340 being held at atmospheric pressure, via an overflow system 342 of tubing and valves. The tubes are designed such that the dimension of the tubes are too large to be completely filled with brine effluent from the pertraction module 305 under normal operational conditions.

The overflow systems 332 and 342 have a feed line for feeding in a liquid, and a exhaust line for allowing liquid to leave, which feed and exhaust are coupled to each other by means of at least one intermediate tube, but preferably at least two intermediate tubes (as shown in FIG. 3) each comprising a valve. Each of the feed line, the exhaust line and the intermediate tube(s) are dimensioned such that the maximum liquid feed can pass through the tube without the liquid occupying the complete inner surface of a cross section in a direction perpendicular to the liquid flow direction.

The intermediate tubes allow liquid to flow from the feed to the exhaust, in case of valves when the valve is opened. When the overflow system has more than one intermediate tube, the overflow system is installed such that the intermediate tubes are positioned at varying altitudes. The highest altitude of the overflow system is provided by one of the intermediate tubes.

By holding the exhaust line at a given pressure (e.g. atmospheric), the intermediate tube, or in case of more than one such intermediate tubes, the intermediate tube with the opened valve and positioned at the lowest altitude as installed, will define an overpressure in the liquid feeding line.

In the pertraction unit 101 in FIGS. 2 and 3, the opened valve 344, located at the highest elevation H2 will define the static pressure in the brine stream in the pertraction module 305. The difference in elevation H2-H1 will define the pressure $\Delta p$ which is established between brine and aniline throughout the pertraction module over the membrane.

By carefully opening appropriate valves in both overflow systems 332 and 342, the pressure $\Delta p$ between aniline and brine can be tuned. The pressure $\Delta p$ is in fact a static pressure occurring between the two streams in the pertraction module 305. This static pressure arrangement allows a careful fine-tuning of the pressure difference between the phases, as a too high pressure on the brine side will result in leaking of the membrane. In this case these pressure differences are very low, typically less than 1 bar, but more preferred less than 0.5 bar.

The brine 346, freed from DADPM in the vessel 340 is further treated in the aniline stripper as is shown in FIGS. 1 and 2.

The aniline 336, with the DADPM is recycled to the feed of the reactor converting aniline and formaldehyde (fed as formalin) into DADPM.

Turning now to the pertraction module 305 of the pertraction unit 101, following membrane was used:

Gore DISSO₃LVE® OZONATION MODULE, which is a hollow fibre membrane module made out of PTFE/PFA. Pore size 0.02 micron and hollow fibres with inside diameter of 2 mm, outside diameter of 3 mm and thickness of 0.5 mm. The porosity of this membrane is 65%. The water starts to breakthrough at a pressure difference of 0.9 bar.

Donaldson #1325, which is a flat sheet membrane made of PTFE with pore size of 0.05 micron, and thickness of 20 micron. The porosity of the membrane is higher than 80%. The water starts to breakthrough at a pressure difference of 0.7 bar.

A brine stream with a flow of 240 l/h was fed to one side of the Gore Disso₃lve ozonation module, the brine stream contained about 0.8 wt % NaCl and contained about 2000 ppm's of DADPM. An aniline stream without DADPM and a flow of 130 l/h was fed to the other side of the Gore Disso₃lve ozonation unit in counter current. Before contacting the module with the brine and the aniline, the module was prewetted with toluene. At a temperature of 80° C. 30% of the DADPM was removed and transferred to the aniline. The mass transfer coefficient in this case was $7*10^{-6}$ m/s.

In another experiment, a brine stream with a flow of 250 l/h was fed to one side of the Gore Disso₃lve ozonation module, the brine stream contained about 12.8 wt % NaCl and contained about 450 ppm's of DADPM. An aniline stream without DADPM and a flow of 150 l/h was fed to the other side of the Gore Disso₃lve ozonation module in counter current. Before contacting the module with the brine and the aniline, the module was prewetted with toluene. At a temperature of 85° C. 55% of the DADPM was removed and transferred to the aniline. The mass transfer coefficient in this case was $1.2*10^{-5}$ m/s.

In another experiment, a brine stream with a flow of 120 l/h was fed to one side of the Gore Disso₃lve ozonation unit, the brine stream contained about 12.67 wt % NaCl and contained about 240 ppm's of DADPM. An aniline stream without DADPM and a flow of 75 l/h was fed to the other side of the Gore Disso₃lve ozonation unit in counter current. Before contacting the module with the brine and the aniline, the module was wetted with methanol. At a temperature of 90° C., 64% of the DADPM was removed and transferred to the aniline. The mass transfer coefficient in this case was $2.7*10^{-5}$ m/s.

The module construction of the flat sheet membrane is to be chemically resistant to aniline or brine. Bonding techniques using chemically resistant plastics, e.g. fluoroplastics such as PTFE, PFA, PVDF, TFM, PTFE, but also e.g. polypropylene, which are thermowelded onto the membranes, optionally to make stacks of 1, 2 or more membranes (each optionally being a stack of a number of porous sheets) and optionally being separated by means of spacers. In this way a sufficiently chemical resistant module can be build.

Figure 4:
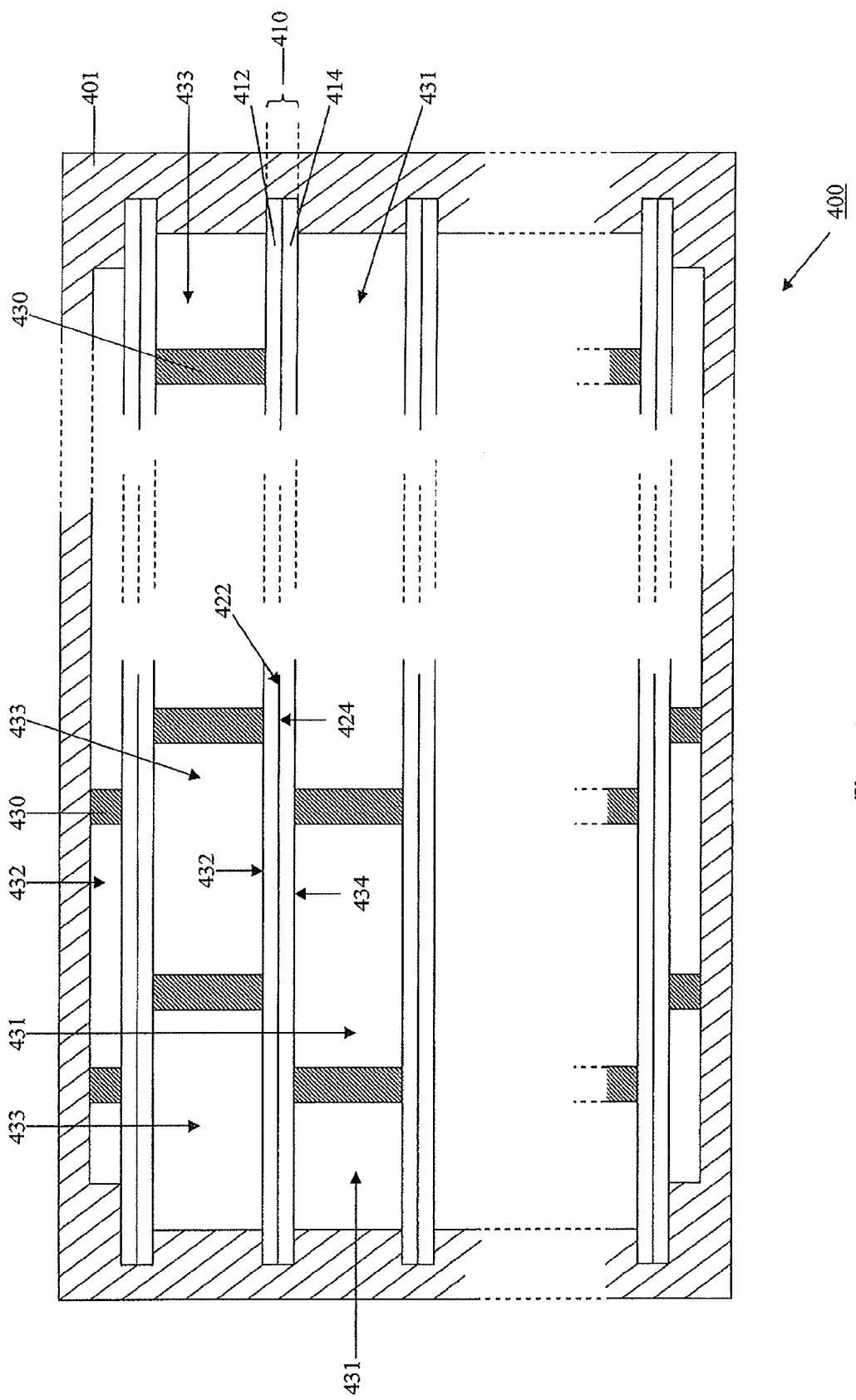
FIG. 4 shows schematically a cross section of a pertraction module.

An example of a module 400 is schematically shown in FIG. 4. A frame 401 holds several membranes 410, each membrane comprising two identical porous sheets 412 and 414. The sheets 412 and 414 contact each other along one of their surfaces, i.e. surface 422 of sheet 412 contacts surface 424 of sheet 414. Between adjacent membranes 410, spacers 430 are provided. As such flow channels, e.g. channels 431, 432 and 433 are provided. The aniline and brine is provided to the flow channels such that each membrane 410 has one surface which is in contact with the aniline stream, the other side of the membrane is in contact with the brine stream. As an example, aniline is provided to the channels 431, allowing the surface 434 of the sheet 414, being a surface of membrane 414, to contact the aniline stream. Brine is provided to the channels 433, allowing the surface 432 of the sheet 412, being a surface of membrane 414, to contact the brine stream.

It is necessary to pre-wet the membrane with a wetting agent before the pertraction may occur. Aniline itself cannot expel the air from the pores inside the membrane. It is not hydrophobic enough to enter into the hydrophobic pores of the membrane and therefore mass transfer of DADPM from the brine to the aniline will not take place. The membrane needs to be pre-wetted before it can be used as a pertraction module, typical solvents which can be used are: toluene, alcohols, e.g. ethanol but preferentially methanol which is already a substance present in the DADPM process. Once pre-wetted the used solvent or wetting agent is removed by dissolving it in aniline. Therefore the solvent in the pores is interchanged with aniline and the pores are then subsequently wetted with aniline assuring that the DADPM transfer from brine to aniline can take place.

The removal efficiency of the DADPM from the brine to the aniline depends on the distribution coefficient, which is a function of a.o. brine strength and temperature. The distribution coefficient is defined as the DADPM concentration in aniline over the DADPM concentration in brine. The distribution coefficient increased with higher brine concentrations and lowers at higher temperatures. Surprisingly, the mass transfer increased significantly at higher temperature, which is due to a salt complex formed between the DADPM and the salt which dissociates at higher temperatures. Therefore to the method preferably operate at a sufficiently high temperature, higher than 50° C. and preferably higher than 80° C. to reduce possible fouling of a complex or salt which can be formed between the brine and DADPM and to get improved mass transfer between the phases.

It is to be understood that although preferred embodiments and/or materials have been discussed for providing embodiments according to the present invention, various modifications or changes may be made without departing from the scope and spirit of this invention. As an example, it is understood that a\the aniline, used as organic phase in the examples, can be replaced by an other organic liquid, such as toluene, without deviation from the present invention. It is also understood that the composition of the aniline liquid used, may vary, e.g. comprise more or less water, without deviation from the present invention.

The invention claimed is:

1. A method for removing methylene-bridged polyphenyl polyamines from an aqueous stream comprising said methylene-bridged polyphenyl polyamines, the method comprising the steps of providing a pertraction equipment comprising a membrane with a first side and a second side opposite to said first side;

bringing an aqueous stream comprising methylene-bridged polyphenyl polyamines into contact with said first side of said membrane and bringing an organic stream into contact with said second side of said membrane, thereby causing the methylene-bridged polyphenyl polyamines to transfer from said aqueous stream through said membrane to said organic stream; wherein, before bringing the aqueous stream and organic stream in contact with said membrane, the membrane is wetted with a liquid having a surface tension of less than 40 mN/m; and wherein said liquid is toluene.

2. The method according to claim 1, wherein said alcohol has a surface tension of more than 15 mN/m and less than 35 mN/m.

3. The method according to claim 1, wherein the membrane, after wetting with said liquid, has a water break through pressure of more than 0.2 bar.

4. The method according to claim 1, wherein the membrane consists of one porous sheet.

5. The method according to claim 1, wherein, wherein the membrane comprises at least two stacked porous sheets.

6. The method according to claim 1, wherein, at least one of said porous sheets has an average pore size less than 0.05 micron.

7. The method according to claim 1, wherein the organic stream used in the pertraction step comprises aniline.

8. The method according to claim 1, wherein the temperature of the aqueous stream and the organic stream during pertraction is in the range of 50 deg C. to 200 deg C.

9. The method according to claim 1, wherein the volume ratio of aqueous stream over organic stream used during pertraction is in the range of 20/1 to 2/1.

10. A method for producing methylene-bridged polyphenyl polyamines, the method comprises the steps of
providing aqueous stream comprising methylene-bridged polyphenyl polyamines and removing methylene-bridged polyphenyl polyamines from said aqueous stream by a method according to claim 1.

11. A method for removing methylene-bridged polyphenyl polyamines from an aqueous stream comprising said methylene-bridged polyphenyl polyamines, the method comprising the steps of
providing a pertraction equipment comprising a membrane with a first side and a second side opposite to said first side;
bringing an aqueous stream comprising methylene-bridged polyphenyl polyamines into contact with said first side of said membrane and bringing an organic stream into contact with said second side of said membrane, thereby causing the methylene-bridged polyphenyl polyamines to transfer from said aqueous stream through said membrane to said organic stream; wherein, before bringing the aqueous stream and organic stream in contact with said membrane, the membrane is wetted with a liquid having a surface tension of less than 40 mN/m; and wherein said liquid is an alcohol.

12. The method according to claim 11, wherein said alcohol has a surface tension of more than 15 mN/m and less than 35 mN/m.

13. The method according to claim 12, wherein said liquid is cyclohexanol, ethanol or methanol.

14. The method according to claim 11, wherein the membrane, after wetting with said liquid, has a water break through pressure of more than 0.2 bar.

15. The method according to claim 11, wherein the membrane consists of one porous sheet.

16. The method according to claim 11, wherein, wherein the membrane comprises at least two stacked porous sheets.

17. The method according to claim 11, wherein, at least one of said porous sheets has an average pore size less than 0.05 micron.

18. The method according to claim 11, wherein the organic stream used in the pertraction step comprises aniline.

19. The method according to claim 11, wherein the temperature of the aqueous stream and the organic stream during pertraction is in the range of 50 deg C. to 200 deg C.

20. The method according to claim 11, wherein the volume ratio of aqueous stream over organic stream used during pertraction is in the range of 20/1 to 2/1.

21. A method for producing methylene-bridged polyphenyl polyamines, the method comprises the steps of
providing aqueous stream comprising methylene-bridged polyphenyl polyamines and removing methylene-bridged polyphenyl polyamines from said aqueous stream by a method according to claim 11.

\* \* \* \* \*